United States Patent
Khouri et al.

(10) Patent No.: US 6,665,396 B1
(45) Date of Patent: Dec. 16, 2003

(54) CALL HOLD MANAGER SYSTEM AND METHOD

(75) Inventors: Joseph F. Khouri, San Jose, CA (US); Shmuel Shaffer, Palo Alto, CA (US)

(73) Assignee: Cisco Technologies, Inc., San Jose, CA (US)

( * ) Notice: Subject to any disclaimer, the term of this patent is extended or adjusted under 35 U.S.C. 154(b) by 422 days.

(21) Appl. No.: 09/680,653

(22) Filed: Oct. 6, 2000

(51) Int. Cl.[7] .............................................. H04M 3/00
(52) U.S. Cl. ........................... 379/266.01; 379/265.01; 379/309
(58) Field of Search ...................... 379/265.01, 265.02, 379/265.03, 265.05, 265.09, 265.1, 265.11, 265.12, 263.13, 265.14, 266.01, 266.02, 266.03, 266.05, 266.06, 266.08, 266.1, 201.01, 309

(56) References Cited

U.S. PATENT DOCUMENTS

| | | | |
|---|---|---|---|
| 4,788,715 A | * 11/1988 | Lee | 379/84 |
| 5,311,574 A | 5/1994 | Livanos | 379/88 |
| 5,329,583 A | 7/1994 | Jurgensen | 379/266 |
| 5,506,898 A | * 4/1996 | Costantini et al. | 379/266 |
| 5,857,018 A | 1/1999 | Sumner | 379/266 |
| 5,905,793 A | * 5/1999 | Flockhart et al. | 379/266 |
| 5,946,388 A | * 8/1999 | Walker et al. | 379/266 |
| 6,002,760 A | * 12/1999 | Gisby | 379/266 |
| 6,046,762 A | * 4/2000 | Sonesh | 348/16 |
| 6,049,603 A | * 4/2000 | Schwartz et al. | 379/309 |
| 6,088,444 A | * 7/2000 | Walker et al. | 379/266 |
| 6,263,066 B1 | * 7/2001 | Shitvelman et al. | 379/266 |
| 6,314,178 B1 | * 11/2001 | Walker et al. | 379/266.01 |
| 6,546,087 B2 | 4/2003 | Shaffer | 379/90.01 |

* cited by examiner

Primary Examiner—William J Deane
(74) Attorney, Agent, or Firm—Baker Botts L.L.P.

(57) ABSTRACT

A communications system having a module operable to a establish a communication channel coupling a terminal unit and a device, in response to a request from the device, is provided. A proxy system may be coupled with the module. In a particular embodiment, the proxy system is operable to receive the request from the device, and create a proxy agent if the terminal unit is unavailable. The proxy agent may also be operable to maintain a position in a queueing system for the device until the terminal unit becomes available. In another embodiment, the proxy system may be operable to notify the device when the terminal unit is available. The communications system may also include an interactive voice response system operable to collect information from the device. The information collected from the device may be used to establish a status, or priority of the request for a connection.

32 Claims, 2 Drawing Sheets

CALL HOLD MANAGER SYSTEM AND METHOD

TECHNICAL FIELD OF THE INVENTION

The present invention relates generally to on hold call management, and more particularly, to a queued software proxy agent system and method.

BACKGROUND OF THE INVENTION

Automatic call distributors (ACDS) are used to collect and distribute telephone calls to awaiting agents, as they become available. Accordingly, incoming calls are evenly distributed between agents on a first in-first out (FIFO) basis. ACDs often include music, announcements and/or advertisements which callers may listen to while waiting for an available agent. In addition, ACDs may be used by companies to manage outgoing calls.

An interactive voice response (IVR) may also be incorporated into the communications network and/or ACD. The purpose of the IVR is to exchange information with a user automatically, without human interaction. Therefore, information may be collected from users while awaiting an available agent.

Users choosing to remain on hold awaiting an available agent and/or resource must maintain an open communication channel between the user and the ACD. Accordingly, time and resources are often wasted until the agent or resource becomes available.

SUMMARY OF THE INVENTION

The present invention provides a system and method for call hold management that substantially eliminate or reduce the problems and disadvantages associated with the previous methods and systems. In particular, software proxy agents are created and queued in place of an on hold connection to free up connection resources and allow the on-hold party to perform other tasks until the called party is available.

In accordance with a particular embodiment of the present invention, a method and system for on hold call processing including a communications module operable to establish a first communication channel coupling a terminal unit and a device, in response to a request from the device, is provided. A proxy system may be coupled with the communication module. The proxy system is operable to receive the request from the device, and create a proxy agent if the terminal unit is unavailable. The proxy agent may also be operable to maintain a position in a queueing system for the device, until the terminal unit becomes available.

In accordance with another aspect of the present invention, the proxy system may be operable to notify the device when the terminal unit will be available. The notification may include placing a telephone call to the calling party when the proxy agent occupies the highest priority in the queueing system. In another embodiment of the present invention, the notification may include interrupting a communication session of the calling party when the proxy agent occupies the highest priority in the queueing system.

In accordance with yet another aspect of the present invention, the communications system may include an interactive voice response system operable to collect information from the device.

Technical advantages of the present invention include providing an improved system and method for on hold call management. In particular, an on hold call is represented by a proxy agent. The proxy agent is operable to maintain a position in a queue for a calling party, when a called party is unavailable. Accordingly, the calling party is free to perform other tasks, and network resources are not unnecessarily wasted.

Another technical advantage of the present invention includes providing a queued software proxy agent wherein the status of the proxy agent is determined using information from the calling party regarding a request for a connection with a called party. Accordingly, incoming requests for communication connections may be prioritized according to specific criteria, including the identity of the calling party, the identity of the called party, and/or the purpose of the request for a connection.

Other technical advantages of the present invention will be readily available to one skilled in the art from the following figures, descriptions, and claims.

BRIEF DESCRIPTION OF THE DRAWINGS

For a more complete understanding of the present invention and its advantages, reference is now made to the following descriptions, taken in conjunction with the accompanying drawings, in which.

DETAILED DESCRIPTION OF THE INVENTION

The preferred embodiments of the present invention and its advantages are best understood by referring now in more detail to FIGS. 1–5 of the drawings, in which like numerals refer to like parts.

Figure 1:
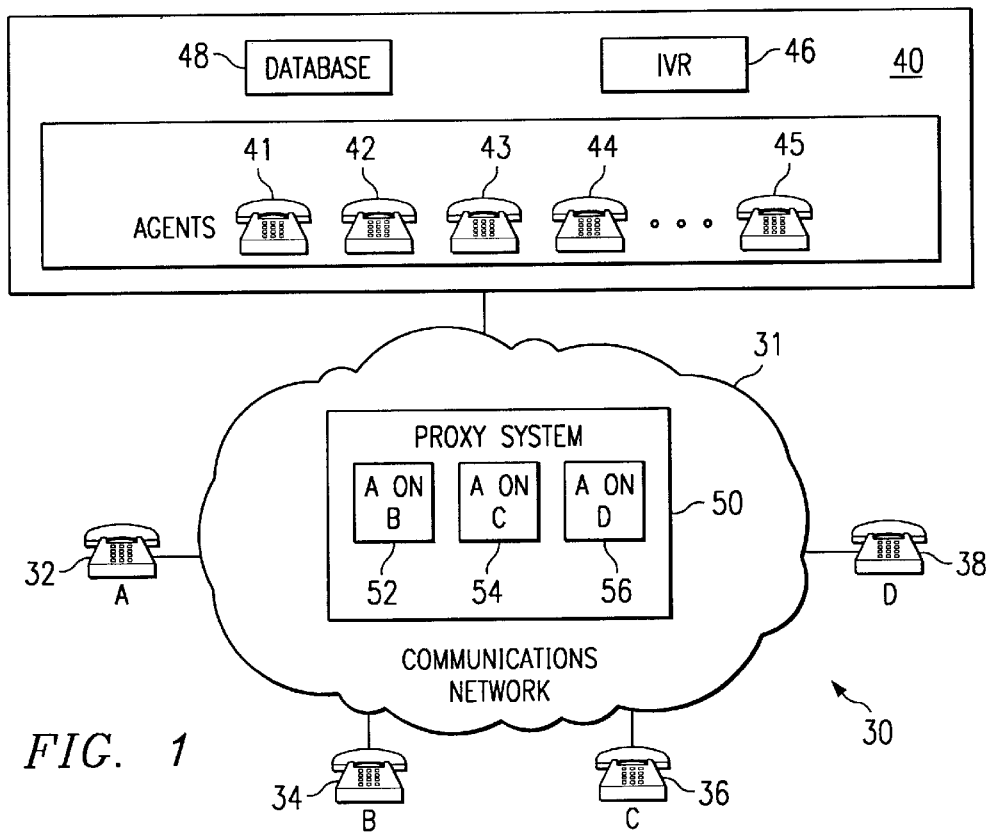
FIG. 1 is a block diagram illustrating a communication network in accordance with one embodiment of the present invention.

Referring now to FIG. 1, a communications network is illustrated and generally designated by the reference number 30. Network 30 includes a plurality of terminal units 32, 34, 36 and 38. Network 30 is also coupled with an automatic call distributor (ACD) 40 and a proxy system 50. Proxy system 50 allows users of terminal units 32, 34, 36 and 38, and ACD 40 to more efficiently utilize their time while waiting for other terminal units, ACD 40 or other network resources to become available.

In the illustrated embodiment communications network 30 includes the public switched telephone network (PSTN), or other suitable telecommunication network 31 which couples terminal units 32, 34, 36 and 38, and ACD 40. In alternative embodiments, communications network 30 may include any computer and/or communication network including, but not limited to the Internet, Intranets, local area networks (LANs), wide area networks (WANs) or metropolitan area networks (MANs), in addition to or in place of telecommunications network 31. Communications network 30 may include twisted pair, cable, optical fiber or other suitable wireline links and/or radio frequency, microwave, infrared or other suitable wireless links. Accordingly, terminal units 32, 34, 36 and 38 may include telephones, computers, personal digital assistants (PDAs) or any other wireline or wireless devices capable of voice and/or data communication over a distributed network.

ACD 40 receives communications originating within network 30 and distributes the communications between one or more of a plurality of agents 41–45. ACD 40 is a specialized phone system used to route and evenly distribute incoming calls to available agents 41–45. ACD 40 may also be used to route and distribute outgoing calls such that agents 41–45 receive priority for outgoing calls based upon the time at which the requests are made by the agents 41–45.

With respect to incoming calls, ACD 40 performs many functions. For example, ACD 40 has the ability to recognize and answer incoming calls. ACD 40 may also include an associated database 48, having instructions on how to handle each call. Based on these instructions, ACD 40 will distribute calls according to specific criteria. Recorded messages may also be incorporated into ACD 40 instructing a caller regarding the average waiting time for soliciting information from a caller. ACD 40 ultimately distributes incoming calls to the first available of agents 41–45.

Terminal units 32, 34, 36 and 38, and/or ACD 40 may also incorporate interactive voice response (IVR) technology. For example, IVR 46 may be incorporated into ACD 40 in order to collect information from users of ACD 40 and/or communications network 30. IVR 46 may be used to collect information from a calling party using analog signals generated by a human voice or other sound, and/or digital signals where the calling party includes the ability to generate digital signals. Accordingly, IVR 46 automates the retrieval and processing of information by phone in order to automate telephone based tasks.

Proxy system 50 is operable to establish, maintain and distribute a plurality of proxy agents 52, 54 and 56 in order to manage and monitor communications throughout network 30. When caller A uses terminal unit 32 and attempts to communicate with caller B on terminal unit 34, caller A may be placed on hold for one or more reasons. For example, if caller B is already using terminal 34 prior to receiving caller A's communication, caller A may immediately be placed on hold pending the availability of terminal unit 34. Alternatively, caller B may place caller A on hold during a telephone conversation. Either way, communication between callers A and B is disrupted and caller A is placed on hold.

Communication network 30 may include a system which plays music, advertisements and/or announcements to caller A while caller A is on hold. Accordingly, caller A has the option to remain on the line and await caller B's availability, or caller A may simply hang up and end the communication session. If caller A elects to remain on the line and await caller B's availability, a communication channel between terminal units 32 and 34 remains active in an unproductive way.

Proxy system 50 provides user A with the ability to effectively use and manage this "down time" while awaiting caller B's availability. Proxy system 50 provides a server based architecture which allows for queuing multiple proxy agents in a plurality of queue's in a coordinated way, thus enabling users of communications network 30 to maximize the efficiency of their communication sessions and transactions without unnecessarily consuming communication channels and/or resources of network 30. In particular, proxy system 50 establishes an agent for a calling party to wait for a called party on behalf of the calling party.

For example, if caller A places a call to caller B and caller B is unavailable or a communication channel between terminal units 32 and 34 is unavailable, caller A may be directed to proxy system 50. Proxy system 50 provides caller A with the option of creating a proxy agent, and use one or more agents 52, 54 and/or 56 to await caller B's availability. Caller A may select to create proxy agent 52 which will wait for caller B to become available, on caller A's behalf. Caller A need not tie up a communication channel while waiting for caller B to become available. Accordingly, caller A may remain "on-hold" without unnecessarily using a communication channel between terminal units 32 and 34.

While caller A is on hold, caller A may place a call to caller C at terminal unit 36. Meanwhile, proxy system 50 will queue proxy agent 52 such that caller A may be connected to caller B according to the time at which caller A's request to communicate with caller B was first received. Alternatively, proxy system 50 may prioritize proxy agent 52 based on information regarding the calling party, or other suitable information, as will be described later in more detail. If caller A establishes a communication with caller C, caller A may be prompted by proxy system 50 during the conversation with caller C, notifying caller A that caller B is available or is about to become available. Therefore, caller A is given the option to remain on the line with caller C or terminate the communication session with caller C in order to communicate with caller B.

In another embodiment, if caller C is unavailable, or later decides to place caller A on hold, a second proxy agent 54 may be created in order to await caller C's availability on caller A's behalf. Since proxy agent 54 will remain in queue on caller A's behalf, caller A is available to communicate with another user of communication network 30. At this point, caller A may opt to place a call to caller D at terminal unit 38. If caller B or caller C becomes available during caller A's communication session with caller D, proxy system 50 may interrupt the communications session between caller A and caller D in order to notify caller A that either caller B or caller C is available or about to become available.

If caller D is unavailable or later decides to place caller A on hold, a third proxy agent 56 may be created in order to await caller D's availability on caller A's behalf. Accordingly, caller A may have multiple proxy agents including, but not limited to proxy agents 52, 54 and 56 awaiting the availability of various callers and/or communication channels on A's behalf, without unnecessarily utilizing one or more communication channels.

While awaiting the availability of callers B, C and/or D, caller A is free to communicate with another user of communication network 30, for example, ACD 40. During caller A's communication session with ACD 40, proxy system 50 may interrupt in order to notify caller A of the availability of caller B, caller C or caller D. Proxy system 50 also manages proxy agents 52, 54 and 56 in order to maintain caller A's queue with respect to each of caller's B, C and D.

Various resources may be available upon communications network 30 through terminal units 34, 36 and 38 and/or ACD 40, to allow caller A to effectively manage the time caller A spends awaiting the availability of another user of the network. The resources available to caller A may include choosing the kind of music, advertisement and/or announcements to listen to, checking account balances, making changes to accounts, accessing voice mail systems, accessing the world wide web, and/or hanging up to await notification from proxy system 50 that caller B, C and/or caller D are available or about to become available.

In a similar manner, if caller A requests a communication session with ACD 40, and all of the agents 41–45 of ACD 40 are busy, and/or there are insufficient resources to establish communication between caller A and any of agents 41–45, a proxy agent may be created in order to place caller A in a queue for the first available, or any particular agent 41–45. Therefore, in a typical call, any user may have any number of proxy agents waiting on the user's behalf having different priority designations and in different locations within the queue.

Proxy system 50 includes software and/or hardware. Proxy system 50 may be centrally located or distributed over a network. Components of proxy system 50 and/or the proxy agents created by proxy system 50 may be stored at one or more central locations, or at or near the terminal unit making the request for a connection (calling party) or the terminal unit receiving the request for a connection (called party).

Figure 2:
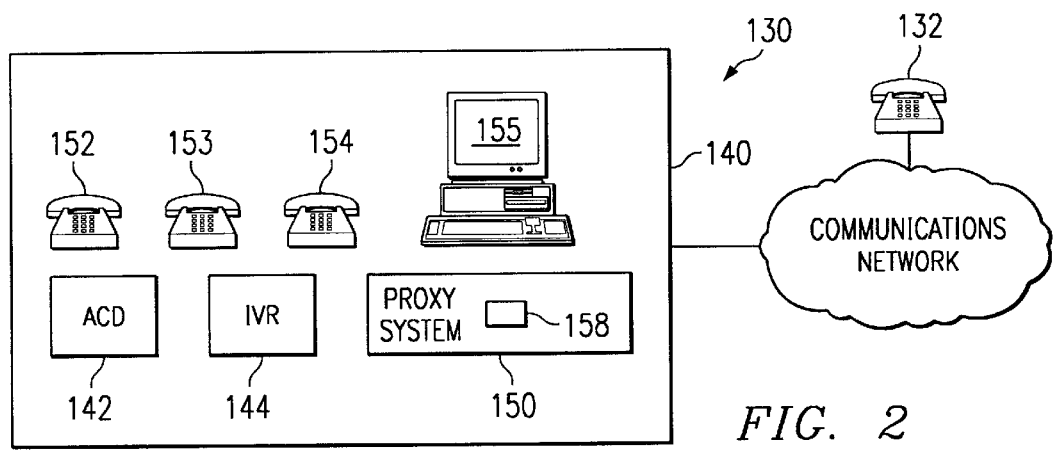
FIG. 2 is a block diagram illustrating a communication network, in accordance with another embodiment of the present invention.

FIG. 2 illustrates an alternative embodiment communications network 130. Network 130 includes a user interface, or terminal unit 132 and an internal network 140. Internal network 140 may be a private network with restricted access, for example, internal to a corporation. Internal network 140 may also incorporate an automated call distributor (ACD) 142, interactive voice response (IVR) 144, and/or a proxy system 150 similar to those described above. Calls received by internal network 140 may be distributed amongst a plurality of agents 152–155.

In a particular embodiment, internal network 140 may include a communications network within a corporation or organization, for example, a multidisciplinary insurance company. Agent 152 may represent a car insurance agent, 153 a home insurance agent, 154 a medical insurance agent, and 155 a voice mail system. A user of terminal unit 132 attempting to contact agent 152 in order to inquire about a car insurance policy may be placed on hold, depending on the availability of agent 152. Proxy system 150 will create a proxy agent 158 in order to await the availability of agent 152. Proxy agent 158 may be created by proxy system 150 automatically, or in response to a request from the user. With proxy agent 158 awaiting agent 152, the user is free to use any service provided by agents 153–155.

For example, a user may inquire about home insurance from agent 153 or medical insurance from agent 154. Alternatively, the user may leave and/or retrieve messages from voice mail system 155. Proxy system 150 may then notify the user just prior to or upon availability of agent 152, leaving the user the opportunity to select to remain in queue for agent 152 and continue with any other agent, or to disconnect from the current communication session in order to contact agent 152. The user may also be given the option to move proxy agent 158 further back in the queue by a specific or approximate period of time, to allow the user to continue their conversation with another agent, without completely losing their place in the queue awaiting agent 152.

As illustrated in FIG. 2, the proxy system may reside internal to a private network, as opposed to residing within an external network like communication network 30 of FIG. 1. Accordingly, a network operator of internal network 140 may incorporate the services available from ACD 142 and IVR 144 into services provided by proxy system 150.

Proxy systems 50 and 150 of the present invention may also be programmed to communicate information regarding each proxy agent between all existing proxy agents in order to update each proxy agent about the relative place in their respective queues. For example, proxy system 50 may update caller A about her position in each different queue. An update provided by proxy system 50 to caller A may include information such as: "a car insurance agent is about to free up. A home insurance agent will be free in two minutes. To connect to the car insurance agent please press '1', to wait for the home insurance agent please press '2', to continue with your current IVR session while maintaining your place in the queues please press '3'." If the user elects to wait for the home insurance agent, her position in the other queue is maintained.

As described herein, the proxy systems of the present invention allow users to make better use of their time while they otherwise would have remained on hold, thereby unnecessarily tying up a communication channel. The efficiency of call centers and internal networks is therefore increased, by allowing users who are waiting for resources to become available to attempt to resolve their issues using an IVR, or other available resource. Accordingly, end user satisfaction is improved. This communication system provides a mechanism for maintaining the position of a caller in multiple queues and allows the user to select the order in which she would like to address each issue.

As previously discussed, terminal units and devices coupled with or forming networks 30 and 130 may include telephones, computers or any device capable of electronic communication. Accordingly, throughout this specification the terms caller and calling party includes any terminal unit or device attempting to communicate with another terminal unit or device. This may include a person operating the device and/or the device itself.

Similarly, the term called party includes any terminal unit or device with which a calling party is attempting to communicate with. This may include a person operating the device and/or the device itself.

Figure 3:
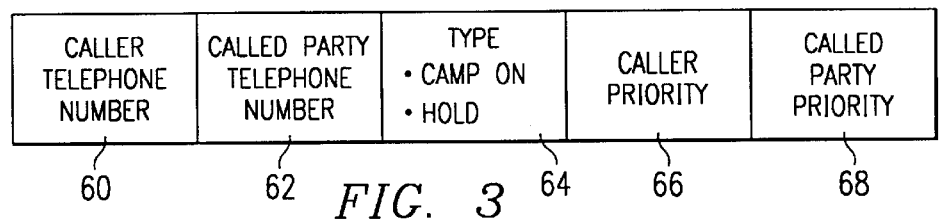
FIG. 3 is a block diagram illustrating a proxy agent, in accordance with one embodiment of the present invention.

FIG. 3 illustrates details of a proxy agent including information which may be collected by proxy system 50 in order to manage and distribute calls more efficiently. In a particular embodiment, proxy system 50 may identify and use the caller's telephone number 60 in order to establish priority in a given queue. Caller telephone number 60 may be identified and/or collected using caller ID technology, or by soliciting this information from the caller through an IVR. If the caller telephone number 60 is determined to be internal to a network of interest, the caller may be provided with priority access to resources as opposed to a user calling from outside of the network. Similarly, proxy system 50 may maintain a database with specific telephone numbers requiring priority access to the network, i.e. the home telephone numbers of executives within an organization and/or priority customers or clients.

In a particular embodiment, the called party telephone number 62 may be used to establish caller priority 66 for a proxy agent within the queue. In order to accomplish this, proxy system 50 may maintain a database of telephone numbers within the network which require priority access. For example, an emergency hotline may be established by the organization which requires immediate access from users outside the network. Alternatively, priority may be given to incoming calls directed to a specific executive(s) of the company or branch of the organization, for example, a sales department.

Priority position within the queue may also be based upon decisions made by the user through IVR 46 or other user prompt. In one embodiment, the type of call 64 awaiting an unavailable resource may determine the proxy agent's priority 66 within the queue. In this embodiment, if a user elects to be placed on hold and remain on the line in order to access other resources, their position in the queue may be advanced ahead of another user who elected to "camp on" and be notified by return phone call when the resource becomes available.

In another embodiment, a database may be established to maintain specific caller priorities 66. Specific callers may be identified by the caller's telephone number 60 or the caller may be asked to provide an access code or user ID. In this embodiment, the database may identify the caller in order to establish their priority within the queue using their telephone number, password, or user ID. Similarly, proxy system 50 may maintain a database including called party priority's 68. The called party priority 68 may be established using the called party telephone number 62 or another method operable to identify the called party and their given status or priority within the organization.

Figure 4:
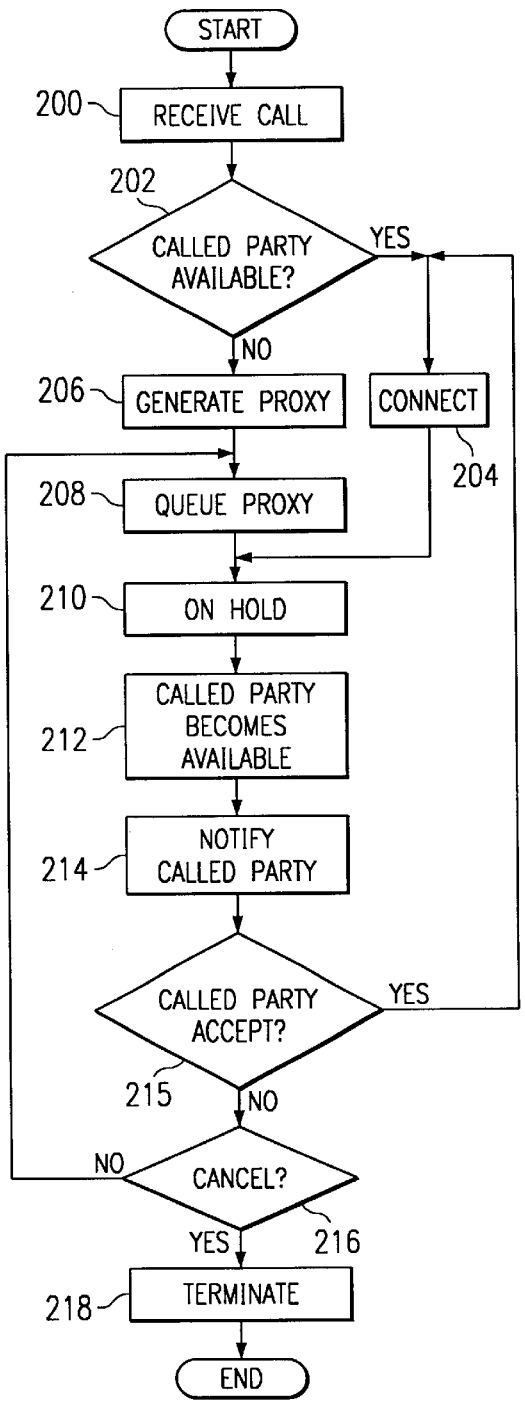
FIG. 4 is a flow diagram illustrating a method for managing communication sessions, in accordance with one embodiment of the present invention.

FIG. 4 is a flow diagram illustrating a method for managing an incoming call. The method of FIG. 4 may be used to create multiple queues for a given user or users.

Referring to FIG. 4, the method begins at step 200 in which a call is received at a communications module. At step 202, the availability of the called party is established. If the called party is available, at step 204 the call is connected to the called party. If the called party is not available, at step 206 a proxy is generated. The proxy may be generated automatically by the proxy system, or in response to a request by the calling party. At step 208 the proxy is queued.

At step 210, the calling party is placed on hold until the called party becomes available at step 212. In a particular embodiment, the connection between the queueing system and the calling party may be automatically terminated if the calling party remains on hold for a predetermined period of time.

Proceeding to step 212, the called party becomes available. Accordingly, at step 214 the called party is notified that a calling party is on hold and would like to communicate with the called party. The called party is given the option to accept, or decline the calling party's request for a connection. If the called party accepts, the calling party is connected at step 204. If the called party does not accept, the calling party is given the option to remain in queue, or terminate at step 218. If the calling party does not cancel the request for a connection at step 216, then the proxy generated for the calling party is returned to the queue, at step 208.

Figure 5:
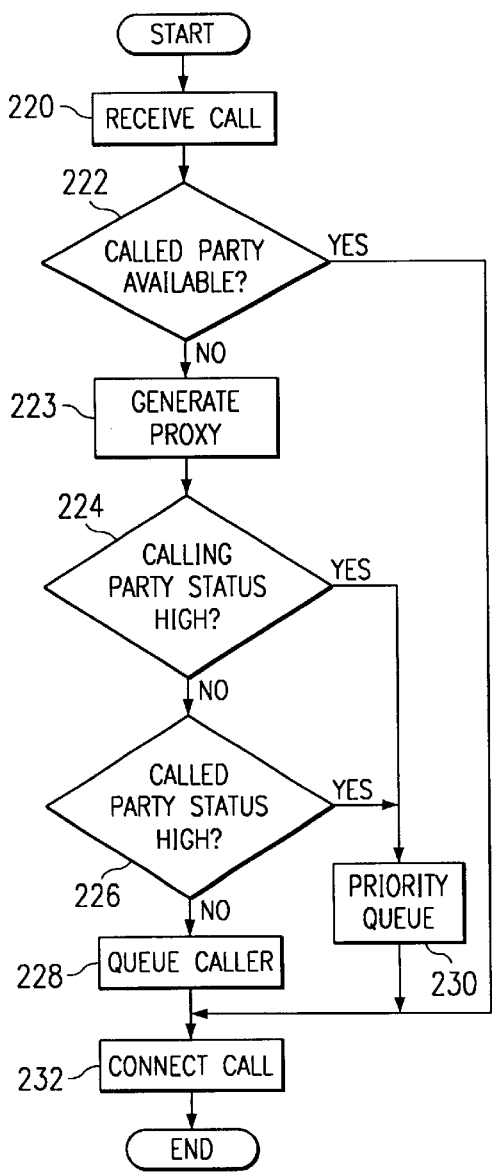
FIG. 5 is a flow diagram illustrating a method for managing communication sessions, in accordance with another embodiment of the present invention.

FIG. 5 is a flow diagram illustrating an alternative embodiment for managing an incoming telephone call. One or more of the steps of FIG. 5 may be used to establish the priority of the calling party in a queue established for connection with the called party.

Referring to FIG. 5, the method begins at step 220 where a call is received from a calling party. At step 222, the availability of the called party, or agent is established. If the called party is available, the call is connected at step 232.

If the called party is not available, a proxy agent is generated at step 223, to await the called party's availability on the calling party's behalf. The network establishes the status of the calling party to determine if the calling party status is high at step 224. If the calling party status is high, the calling party may be placed in a priority queue at step 230.

Next, if the calling party status is not high, the network establishes the status of the called party to determine whether the called party status is high, at step 226. If the called party status is high, the calling party may be placed in a priority queue at step 230. If the called party status is not high, the calling party may be placed in a standard queue at step 228.

Calling parties in a priority queue may be given priority over calling parties in a standard queue. Therefore, when the called party becomes available, calling parties within the priority queue will be connected at step 232 ahead of calling parties queued at step 228. If there are no priority queues, calling parties from the standard queue will be connected at step 232.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A method for managing on hold calls, comprising;
   receiving at a proxy system a first request from a calling party for a first connection to a first called party;
   generating a first proxy agent for the calling party if the first called party is unavailable;
   maintaining the first proxy agent in a first queue in place of the calling party to allow disconnection of the calling party;
   notifying the calling party when the first called party is available and the first proxy agent occupies a highest priority in the first queue;
   receiving at the proxy system a second request from the calling party for a connection to a second called party while the first proxy agent is maintained in the first queue;
   generating a second proxy agent for the calling party if the second called party is unavailable;
   maintaining the second proxy agent in a second queue in place of the calling party to allow disconnection of the calling party; and
   notifying the calling party when the second called party is available and the second proxy agent occupies a highest priority in the second queue.

2. The method of claim 1, wherein the highest priority in the first or second queue is established based on a time of the connection.

3. The method of claim 2, wherein the status assigned to the first or second request for a connection is established according to a telephone number of the first called party or a telephone number of the second called party, respectively.

4. The method of claim 1, wherein the highest priority in the first or second queue is established according to a status assigned to the first or second request for a connection, respectively.

5. The method of claim 4, wherein the status assigned to the first or second request for a connection is established according to whether the calling party has elected to maintain a connection to the proxy system or disconnect from the proxy system.

6. The method of claim 5, further comprising:
   advancing the first or second proxy agent in the first or second queue, respectively, ahead of a second calling party who elected to disconnect from the proxy system, if the first calling elected to maintain a connection to the proxy system.

7. The method of claim 5, further comprising:
   terminating the connection between the calling party and the proxy system if the calling party elects to maintain a connection to the proxy system and the connection has been maintained for a predetermined period of time without the calling party being connected to the first or second called party.

8. The method of claim 4, wherein the first queue comprises a priority queue and a standard queue, the priority queue receiving preference of the standard queue; and
   wherein the first proxy agent is maintained in either the priority queue or the standard queue according to the status of the first request for a connection.

9. The method of claim 4, wherein the status assigned to the first or second request for a connection is established according to an identification number of the calling party.

10. The method of claim 9, further comprising:
    determining a telephone number of the calling party; and
    wherein the identification number corresponds to the telephone number of the calling party.

11. The method of claim 9, further comprising:
    determining a user identification of the calling party; and
    wherein the identification number corresponds to the user identification of the calling party.

12. The method of claim 9, further comprising:
    maintaining a database of specific identifcation numbers to prioritize over other identification numbers;
    comparing the identification number of the calling party to the database of specific identifcation numbers to prioritize over other identification numbers; and
    advancing the first or second proxy agent in the first or second queue, respectively, if the database includes the identification number of the calling party.

13. The method of claim 1, further comprising notifying the calling party by placing a telephone call to the calling party when the first or second proxy agent occupies the highest priority in the first or second queue, respectively.

14. The method of claim 1, further comprising notifying the calling party by playing a message during a communication session of the calling party when the first or second proxy agent occupies the highest priority in the first or second queue, respectively.

15. The method of claim 1, further comprising providing status updates to the calling party while the first or second proxy agent is maintained in the first or second queue, respectively.

16. The method of claim 15, wherein the status updates include information regarding the priority of the first or second proxy agent in the first or second queue, respectively.

17. The method of claim 16, wherein the information includes an estimated time remaining until the first or second called party becomes available.

18. The method of claim 15, wherein the status updates are provided to the calling party at predetermined time intervals.

19. The method of claim 15, wherein the status updates are provided to the calling party in response to a change in status of the first or second proxy agent in the first or second queue, respectively.

20. The method of claim 15, wherein the status updates are provided to the calling part in response to a request for status received from the calling party.

21. The method of claim 1, further comprising giving the calling party the option of moving the first or second proxy agent back in the first or second queue, respectively, in response to a notification that the first or second proxy occupies the highest priority in the first or second queue, respectively.

22. The method of claim 21, wherein the first or second proxy agent may be moved back in the first or second queue, respectively, a specific period of time selected by the calling party.

23. The method of claim 21, wherein the first or second proxy agent may be moved back in the first or second queue, respectively, an approximate period of time selected by the calling party.

24. A communications system, comprising:
 a communications module operable to establish a first communication channel coupling a first terminal unit and a device, in response to a first request from the device;
 the communications module operable to establish a second communication channel coupling a second terminal unit and the device, in response to a second request from the device;
 a proxy system coupled with the communications module;
 the proxy system operable to receive the first request from the device, and create a first proxy agent if the first terminal unit is unavailable;
 the first proxy agent operable to maintain a first position in a queueing system for the device until the first terminal unit becomes available;
 the proxy system operable to receive the second request from the device while the first proxy agent is maintained in the queueing system, and create a second proxy agent if the second terminal is unavailable; and
 the second proxy agent operable to maintain a second position in the queueing system for the device until the second terminal unit becomes available.

25. The communications system of claim 24, wherein the proxy system is operable to notify the device when the first terminal unit will be available.

26. The communications system of claim 24, wherein the proxy system is operable to notify the device when the second terminal device will be available.

27. The communications system of claim 24, further comprising an interactive voice response system operable to collect information from the device.

28. A computer readable medium encoded with a computer program operable to:
 receive a first request from a device for a connection to a first terminal unit;
 generate a first proxy agent if the first terminal unit is unavailable;
 queue the first proxy agent to maintain a first position in a first queue for the device, while the first terminal unit is unavailable;
 notify the device when the first terminal unit will become available;
 receive a second request from the device for a connection to a second terminal unit while the first proxy agent is maintained in the first queue;
 generate a second proxy agent if the second terminal unit is unavailable;
 queue the second proxy agent to maintain a second position in a second queue for the device while the second terminal unit is unavailable; and
 notify the device when the second terminal unit will become available.

29. The computer readable medium of claim 28, wherein the computer program is further operable to collect information from the device while the first or second proxy agent is in the first or second queue, respectively.

30. The computer readable medium of claim 29, wherein the computer program is further operable to determine the first or second position in the first or second queue, respectively, based upon the information collected from the device.

31. A system for managing network communications, comprising:
 means for receiving at a proxy system a first request from a calling party for a connection to a first called party;
 means for generating a first proxy agent for a calling party if the first called party is unavailable;
 means for maintaining the first proxy agent in a first queue in place of the calling party to allow disconnection of the calling party;
 means for notifying the calling party when the first called party is available and the first proxy agent occupies the highest priority in the first queues;
 means for receiving at a proxy system a second request from the calling party for a connection to a second called party while the first proxy agent is maintained in the first queue;
 means for generating a second proxy agent for the calling party if the second called party is unavailable;
 means for maintaining the second proxy agent in a second queue in place of the calling party to allow disconnection of the calling party;
 means for notifying the calling party when the second called party is available and the second proxy agent occupies the highest priority in the second queue.

32. The system of claim 31, further comprising means for determining a telephone number of the calling party.

* * * * *